US012581055B2

(12) United States Patent
Wu et al.

(10) Patent No.: US 12,581,055 B2
(45) Date of Patent: Mar. 17, 2026

(54) VERIFICATION METHOD FOR A PANORAMIC LENS FOCUSING WORKSTATION

(71) Applicant: Cheng Uei Precision Industry Co., Ltd., New Taipei City (TW)

(72) Inventors: Ti Wu, New Taipei City (TW); Chia Hsun Lin, New Taipei City (TW)

(73) Assignee: Cheng Uei Precision Industry Co., Ltd., New Taipei City (TW)

( * ) Notice: Subject to any disclaimer, the term of this patent is extended or adjusted under 35 U.S.C. 154(b) by 0 days.

(21) Appl. No.: 18/935,771

(22) Filed: Nov. 4, 2024

(65) Prior Publication Data

US 2025/0330564 A1 Oct. 23, 2025

(30) Foreign Application Priority Data

Apr. 17, 2024 (CN) ......................... 202410461680.0

(51) Int. Cl.
| | |
|---|---|
| *H04N 17/00* | (2006.01) |
| *H04N 23/55* | (2023.01) |
| *H04N 23/56* | (2023.01) |
| *H04N 23/67* | (2023.01) |

(52) U.S. Cl.
CPC ........... *H04N 17/002* (2013.01); *H04N 23/55* (2023.01); *H04N 23/67* (2023.01); *H04N 23/56* (2023.01)

(58) Field of Classification Search
CPC ...... H04N 17/002; H04N 23/67; H04N 23/55; H04N 23/56
See application file for complete search history.

(56) References Cited

U.S. PATENT DOCUMENTS

| | | | | |
|---|---|---|---|---|
| 6,636,298 | B1 * | 10/2003 | Bachelder .......... | G01N 21/8806 |
| | | | | 356/73.1 |
| 7,221,805 | B1 * | 5/2007 | Bachelder .............. | G03B 13/36 |
| | | | | 396/77 |
| 11,866,466 | B2 * | 1/2024 | Nairn ...................... | A61P 35/00 |
| 12,251,267 | B2 * | 3/2025 | Dickie ................... | A61B 8/565 |
| 2015/0007983 | A1 * | 1/2015 | Tjhang ................... | E21B 21/00 |
| | | | | 166/250.01 |
| 2018/0011211 | A1 * | 1/2018 | Leonard ............... | G01N 29/221 |
| 2018/0259759 | A1 * | 9/2018 | Kim ................... | G02B 21/0032 |
| 2019/0188432 | A1 * | 6/2019 | Lozano ............. | G06K 7/10801 |
| 2020/0209209 | A1 * | 7/2020 | Salazar ................. | G01N 33/24 |
| 2020/0238525 | A1 * | 7/2020 | Drixler ................. | B25J 9/1697 |
| 2021/0052990 | A1 * | 2/2021 | Stepanian ............. | A63G 31/16 |
| 2021/0118180 | A1 * | 4/2021 | Zamora Esquivel ..... | G06T 7/74 |
| 2021/0129971 | A1 * | 5/2021 | Brown, Jr. ........... | G06T 7/0004 |
| 2021/0155030 | A1 * | 5/2021 | Kurani ................... | G06F 3/016 |
| 2021/0203825 | A1 * | 7/2021 | Yao ...................... | H04N 23/685 |
| 2021/0353252 | A1 * | 11/2021 | Reinstein ................. | G06T 7/73 |
| 2022/0203130 | A1 * | 6/2022 | Vojan .................... | G16H 50/20 |
| 2022/0206648 | A1 * | 6/2022 | Vojan .................... | G16H 30/20 |

(Continued)

*Primary Examiner* — Zaihan Jiang

(57) ABSTRACT

A method of verifying a focusing operation of a panoramic lens performs a focusing test on the panoramic lens including aligning a focus adjusting ring and a calliper on a panoramic lens focusing workstation. If the focus adjusting ring and the calliper are aligned, a focal length adjusting test is executed for the panoramic lens. A focalizer is controlled to execute the focal length adjusting test. The focusing test of the panoramic lens is performed before and after the panoramic lens is affixed to a printed circuit board assembly of a lens holder.

6 Claims, 8 Drawing Sheets

(56) References Cited

U.S. PATENT DOCUMENTS

| | | | |
|---|---|---|---|
| 2022/0309953 A1* | 9/2022 | Maddahi | G09B 23/283 |
| 2023/0020652 A1* | 1/2023 | Aleem | G01B 11/022 |
| 2023/0181160 A1* | 6/2023 | Chiang | A61B 8/461 |
| | | | 600/444 |
| 2023/0286995 A1* | 9/2023 | Banerjee | C07D 471/04 |
| 2024/0331349 A1* | 10/2024 | Wajjala | G06F 18/22 |
| 2024/0416459 A1* | 12/2024 | Turner | B23K 26/38 |
| 2025/0191680 A1* | 6/2025 | Boutet | G06T 7/0012 |
| 2025/0218201 A1* | 7/2025 | Mavropoulos | G06V 10/82 |

* cited by examiner

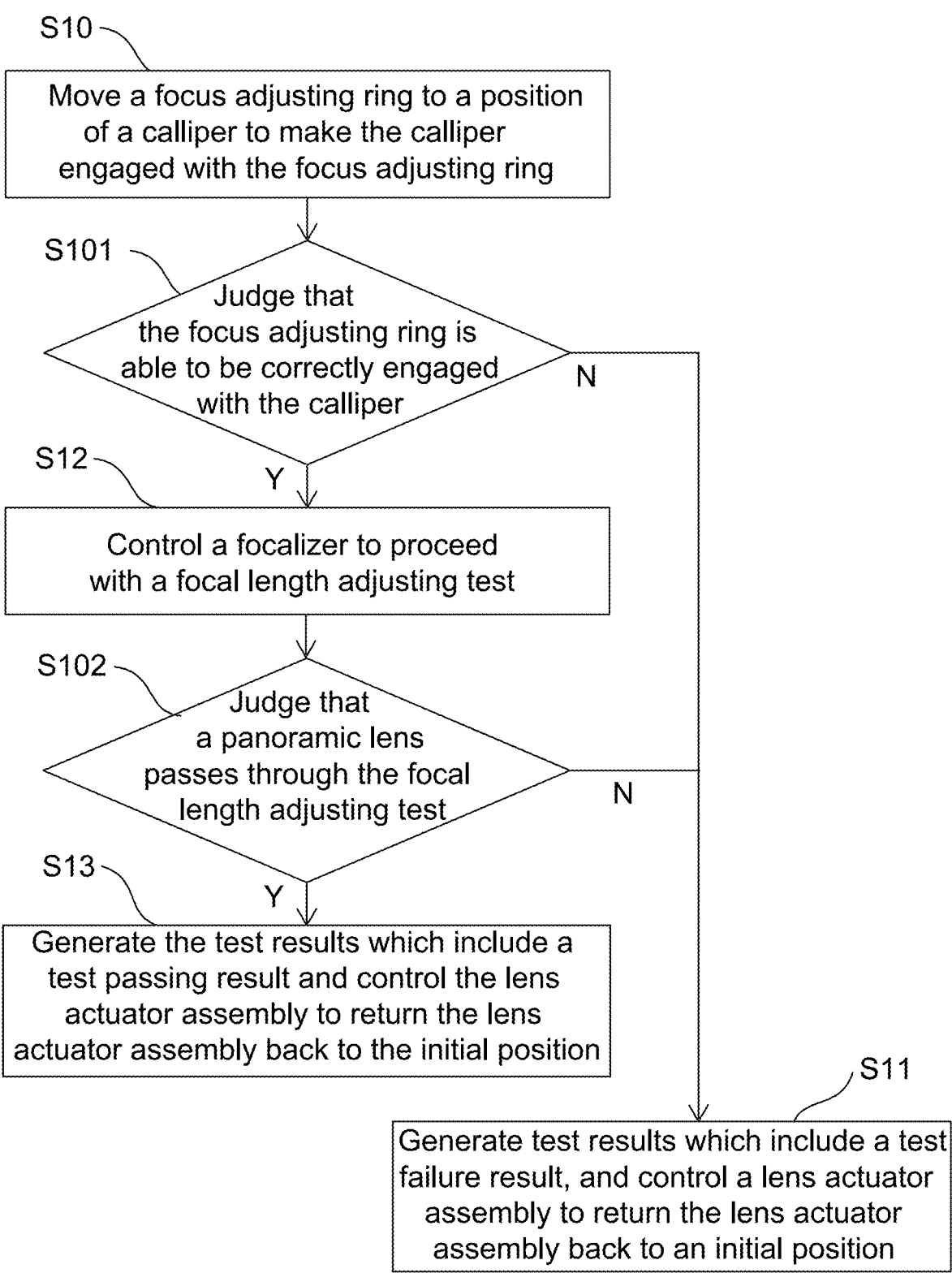

S10

Move a focus adjusting ring to a position
of a calliper to make the calliper
engaged with the focus adjusting ring

S101

Judge that
the focus adjusting ring is
able to be correctly engaged
with the calliper

N

Y

S12

Control a focalizer to proceed
with a focal length adjusting test

S102

Judge that
a panoramic lens
passes through the focal
length adjusting test

N

Y

S13

Generate the test results which include a
test passing result and control the lens
actuator assembly to return the lens
actuator assembly back to the initial position

S11

Generate test results which include a test
failure result, and control a lens actuator
assembly to return the lens actuator
assembly back to an initial position

FIG.2

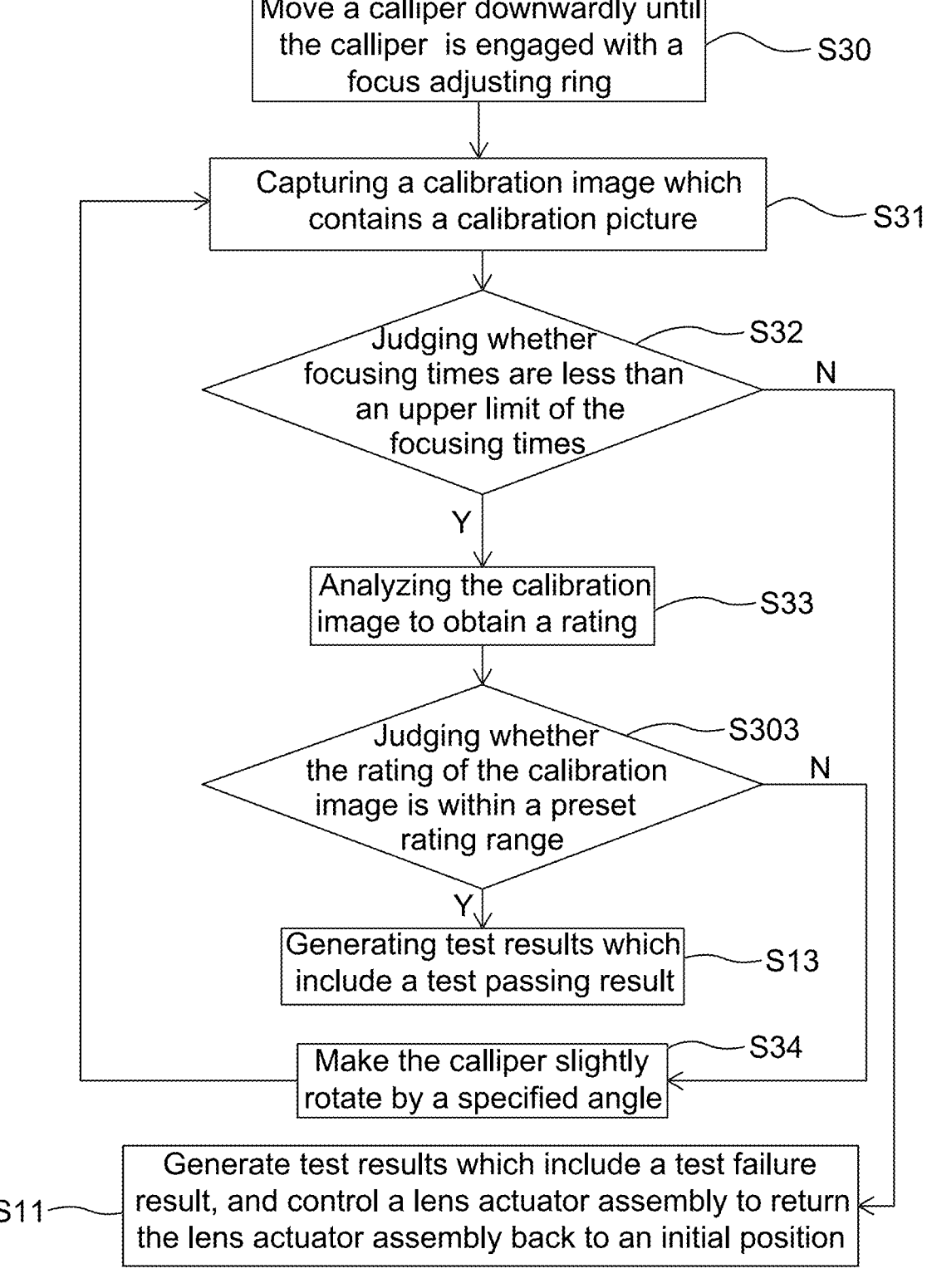

Move a calliper downwardly until the calliper is engaged with a focus adjusting ring — S30

Capturing a calibration image which contains a calibration picture — S31

Judging whether focusing times are less than an upper limit of the focusing times — S32

N

Y

Analyzing the calibration image to obtain a rating — S33

Judging whether the rating of the calibration image is within a preset rating range — S303

N

Y

Generating test results which include a test passing result — S13

Make the calliper slightly rotate by a specified angle — S34

Generate test results which include a test failure result, and control a lens actuator assembly to return the lens actuator assembly back to an initial position — S11

VERIFICATION METHOD FOR A PANORAMIC LENS FOCUSING WORKSTATION

CROSS REFERENCE TO RELATED APPLICATIONS

The present application is based on, and claims priority from, China Patent Application No. 202410461680.0, filed Apr. 17, 2024, the disclosure of which is hereby incorporated by reference herein in its entirety.

BACKGROUND OF THE INVENTION

Field of the Invention

The present invention generally relates to a lens focusing verification method, and more particularly to a verification method for a panoramic lens focusing workstation capable of performing a focusing operation of a panoramic lens.

Description of Related Art

In a process of assembling a lens, proceed with a prefocus test of a semi-finished lens which is temporarily assembled at a focusing workstation firstly. Then after a focal length between a lens and a printed circuit board is confirmed to be correct, the lens is affixed to the printed circuit board by the active alignment (AA) workstation. At last, the assembled lens completes a refocus test by another focusing workstation for ensuring that the focal length between the lens and the printed circuit board is still correct, so before the lens is processed or after the lens is processed, an imaging of the lens is still clear. Nevertheless, when the lens is assembled, it is easy to accidentally touch the lens with an adhesive gel which is incompletely solidified, consequently, the focal length between the lens and the printed circuit board causes an error before the lens is affixed to the printed circuit board or after the lens is affixed to the printed circuit board.

Referring to FIG. 8, in order to solve the above-mentioned problems, a lens focusing workstation 100 is designed to reduce a situation of accidentally touching the lens. The lens focusing workstation 100 includes a base 10, a lens actuator assembly 20, a lens holder 30, an image capturing unit 40, a focalizer 50, a plane light source unit 65, and a control unit. The lens actuator assembly 20 is mounted on the base 10. The lens holder 30 is mounted on the lens actuator assembly 20. The image capturing unit 40 is mounted on a middle of the lens actuator assembly 20. The plane light source unit 65 is fixed above the base 10 to illuminate the lens holder 30 which is placed below the plane light source unit 65. The lens focusing workstation 100 proceeds with a focusing test of the lens by the lens actuator assembly 20, the focalizer 50 and the plane light source unit 65 which are controllable. However, a panoramic lens is larger in size, and a visible range of the panoramic lens is a wide circumferential view so that the aforesaid lens focusing workstation 100 is unsuitable for performing a focusing test on the panoramic lens.

Therefore, it is necessary to provide a verification method for a panoramic lens focusing workstation so as to perform a focusing test on a panoramic lens.

BRIEF SUMMARY OF THE INVENTION

An object of the present invention is to provide a verification method for a panoramic lens focusing workstation,

2 the panoramic lens focusing workstation performing a focusing test on a panoramic lens, the panoramic lens having a focus adjusting ring, the panoramic lens focusing workstation having a base, a lens actuator assembly fixed on the base, a lens holder fixed on the lens actuator assembly, an image capturing unit arranged on the lens holder, a focalizer fastened on the base, a plurality of light source units fastened on four corners of the base, a first camera fastened above the base, a second camera mounted on the lens actuator assembly, and a control unit electrically connected with the lens actuator assembly, the first camera, the focalizer, the plurality of the light source units, the second camera and the image capturing unit, the image capturing unit being located at an optical axis of the panoramic lens to capture images by the panoramic lens, the focalizer having a calliper, the profile of the calliper matched with the profile of the focus adjusting ring, the plurality of the light source units providing a calibration picture, the panoramic lens being mounted on the image capturing unit, the verification method for the panoramic lens focusing workstation comprising steps of: controlling the lens actuator assembly and the focalizer according to preset data stored in a storage medium of the control unit, and then moving the focus adjusting ring to a position of the calliper to make an image of the calliper matched with an image of the focus adjusting ring, executing the next step of generating test results which include a test failure result and controlling the lens actuator assembly according to the preset data to return the lens actuator assembly back to an initial position if the control unit judges that the image of the focus adjusting ring is unable to be correctly matched with the image of the calliper, and executing a step of controlling the focalizer to adjust a focal length of the panoramic lens to proceed with a focal length adjusting test if the control unit judges that the image of the focus adjusting ring is able to be correctly matched with the image the calliper; generating the test results which include the test failure result by the control unit, and controlling the lens actuator assembly according to the preset data to return the lens actuator assembly back to an original point which is the initial position of the lens actuator assembly; controlling the focalizer according to the preset data by the control unit to adjust the focal length of the panoramic lens to proceed with the focal length adjusting test of the panoramic lens, executing the step of generating the test results which include the test failure result and controlling the lens actuator assembly according to the preset data to return the lens actuator assembly back to the initial position if the control unit judges that the panoramic lens is without passing the focal length adjusting test, and executing the next step of generating the test results which include a test passing result by the control unit, and controlling the lens actuator assembly according to the preset data to return the lens actuator assembly back to the initial position if the control unit judges that the panoramic lens passes the focal length adjusting test; and generating the test results which include the test passing result by the control unit, and controlling the lens actuator assembly according to the preset data to return the lens actuator assembly back to the initial position.

Another object of the present invention is to provide a verification method for a panoramic lens focusing workstation, the panoramic lens focusing workstation performing a focusing test on a panoramic lens which has a focus adjusting ring, the panoramic lens focusing workstation including a base, a lens actuator assembly fixed on the base, a lens holder fixed on the lens actuator assembly, an image capturing unit arranged on the lens holder, a focalizer fastened on the base, a plurality of light source units fastened on four corners of the base, a first camera fastened above the base, a second camera mounted on the lens actuator assembly, and a control unit electrically connected with the lens actuator assembly, the first camera, the focalizer, the plurality of the light source units, the second camera and the image capturing unit, the focalizer having a calliper, the profile of the calliper matched with the profile of the focus adjusting ring, the plurality of the light source units providing a calibration picture, the verification method for the panoramic lens focusing workstation comprising steps of: mounting the panoramic lens to the lens holder, the panoramic lens being mounted on the image capturing unit, the image capturing unit being located at an optical axis of the panoramic lens; controlling the lens actuator assembly and the focalizer according to preset data to calibrate a position of the panoramic lens and a position of the calliper, and then moving the focus adjusting ring to the position of the calliper to make an image of the calliper matched with an image of the focus adjusting ring; executing the next step of generating test results which include a test failure result and controlling the lens actuator assembly according to the preset data to return the lens actuator assembly back to an initial position if the control unit judges that the image of the focus adjusting ring is unable to be correctly matched with the image of the calliper, and executing a step of controlling the focalizer to adjust a focal length of the panoramic lens to proceed with a focal length adjusting test if the control unit judges that the image of the focus adjusting ring is able to be correctly matched with the image of the calliper; generating the test results which include the test failure result by the control unit, and controlling the lens actuator assembly according to the preset data to return the lens actuator assembly back to the initial position; controlling the focalizer according to the preset data by the control unit to adjust the focal length of the panoramic lens to proceed with the focal length adjusting test of the panoramic lens; executing the step of generating the test results which include the test failure result and controlling the lens actuator assembly according to the preset data to return the lens actuator assembly back to the initial position if the control unit judges that the panoramic lens is without passing the focal length adjusting test, and executing the next step of generating the test results which include a test passing result by the control unit, and controlling the lens actuator assembly according to the preset data to return the lens actuator assembly back to the initial position if the control unit judges that the panoramic lens passes the focal length adjusting test; and generating the test results which include the test passing result by the control unit, and controlling the lens actuator assembly according to the preset data to return the lens actuator assembly back to the initial position.

Another object of the present invention is to provide a verification method for a panoramic lens focusing workstation, the panoramic lens focusing workstation performing a focusing test on a panoramic lens which has a focus adjusting ring, the panoramic lens focusing workstation including a base, a lens actuator assembly fixed on the base, a lens holder fixed on the lens actuator assembly, an image capturing unit arranged on the lens holder, a focalizer fastened on the base, a plurality of light source units fastened on four corners of the base, a first camera fastened above the base, a second camera mounted on the lens actuator assembly, and a control unit electrically connected with the lens actuator assembly, the first camera, the focalizer, the plurality of the light source units, the second camera and the image capturing unit, the focalizer having a calliper, the profile of the calliper matched with the profile of the focus adjusting ring, the verification method for the panoramic lens focusing workstation comprising steps of: mounting the panoramic lens to the lens holder, the panoramic lens being connected to the image capturing unit, the image capturing unit being located at an optical axis of the panoramic lens; controlling the lens actuator assembly and the focalizer according to preset data to calibrate a position of the panoramic lens and a position of the calliper, and then moving the focus adjusting ring to the position of the calliper, and then capturing an image of the focus adjusting ring by the first camera and capturing an image of the calliper by the second camera, and then judging whether the image of the calliper matches with the image of the focus adjusting ring; executing the next step of generating test results which include a test failure result and controlling the lens actuator assembly according to the preset data to return the lens actuator assembly back to an initial position if the control unit judges that the image of the focus adjusting ring is unable to be correctly matched with the image of the calliper, and executing a step of controlling the focalizer to adjust a focal length of the panoramic lens to proceed with a focal length adjusting test if the control unit judges that the image of the focus adjusting ring is able to be correctly matched with the image of the calliper; generating the test results which include the test failure result by the control unit, and controlling the lens actuator assembly according to the preset data to return the lens actuator assembly back to the initial position; controlling the focalizer according to the preset data by the control unit to adjust the focal length of the panoramic lens to proceed with the focal length adjusting test of the panoramic lens; executing the step of generating the test results which include the test failure result and controlling the lens actuator assembly according to the preset data to return the lens actuator assembly back to the initial position if the control unit judges that the panoramic lens is without passing the focal length adjusting test, and executing the next step of generating the test results which include a test passing result by the control unit, and controlling the lens actuator assembly according to the preset data to return the lens actuator assembly back to the initial position if the control unit judges that the panoramic lens passes the focal length adjusting test; and generating the test results which include the test passing result by the control unit, and controlling the lens actuator assembly according to the preset data to return the lens actuator assembly back to the initial position, wherein before the panoramic lens is affixed to a printed circuit board assembly of the lens holder, the focusing test of the panoramic lens is performed by the panoramic lens focusing workstation, and after the panoramic lens is affixed to the printed circuit board assembly of the lens holder, the focusing test of the panoramic lens is performed by the panoramic lens focusing workstation.

As described above, the verification method for the panoramic lens focusing workstation is able to proceed with a focusing operation of the panoramic lens, the panoramic lens focusing workstation adjusts the focal length of the panoramic lens before the panoramic lens is affixed to the printed circuit board assembly and after the panoramic lens is affixed to the printed circuit board assembly, so a focusing misalignment of the panoramic lens is prevented after the panoramic lens is processed. As a result, a precision of the focal length of the panoramic lens is improved, and quality of the panoramic lens is improved.

BRIEF DESCRIPTION OF THE DRAWINGS

The present invention will be apparent to those skilled in the art by reading the following description, with reference to the attached drawings, in which:

FIG. 2 is a flow chart of a verification method for the panoramic lens focusing workstation in accordance with the present invention;

FIG. 6 is a flow chart of focusing the panoramic lens by the panoramic lens focusing workstation according to the present invention;

DETAILED DESCRIPTION OF THE INVENTION

Figure 1:
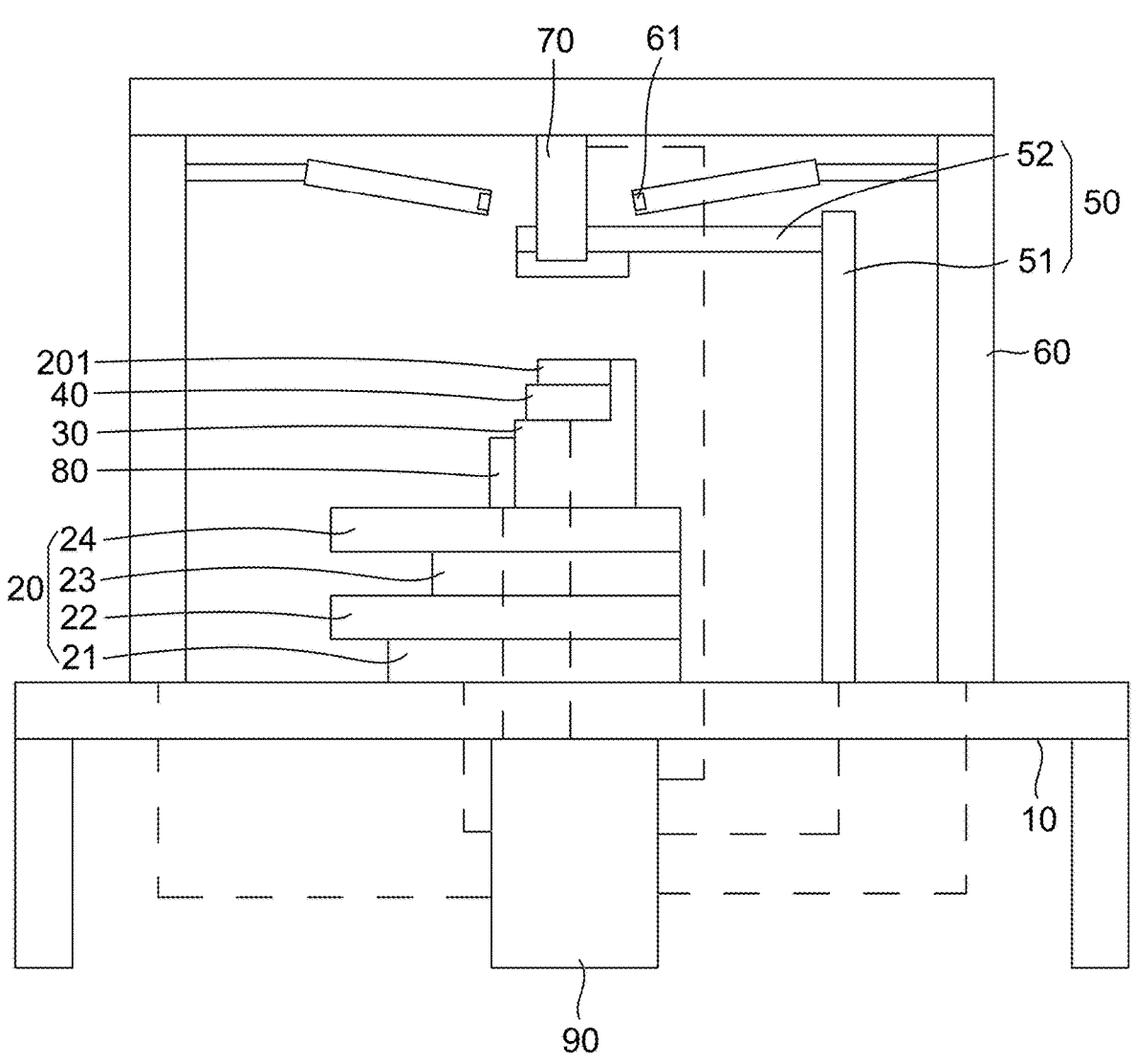
FIG. 1 is an architectural diagram of a panoramic lens focusing workstation in accordance with the present invention.
Figure 3:
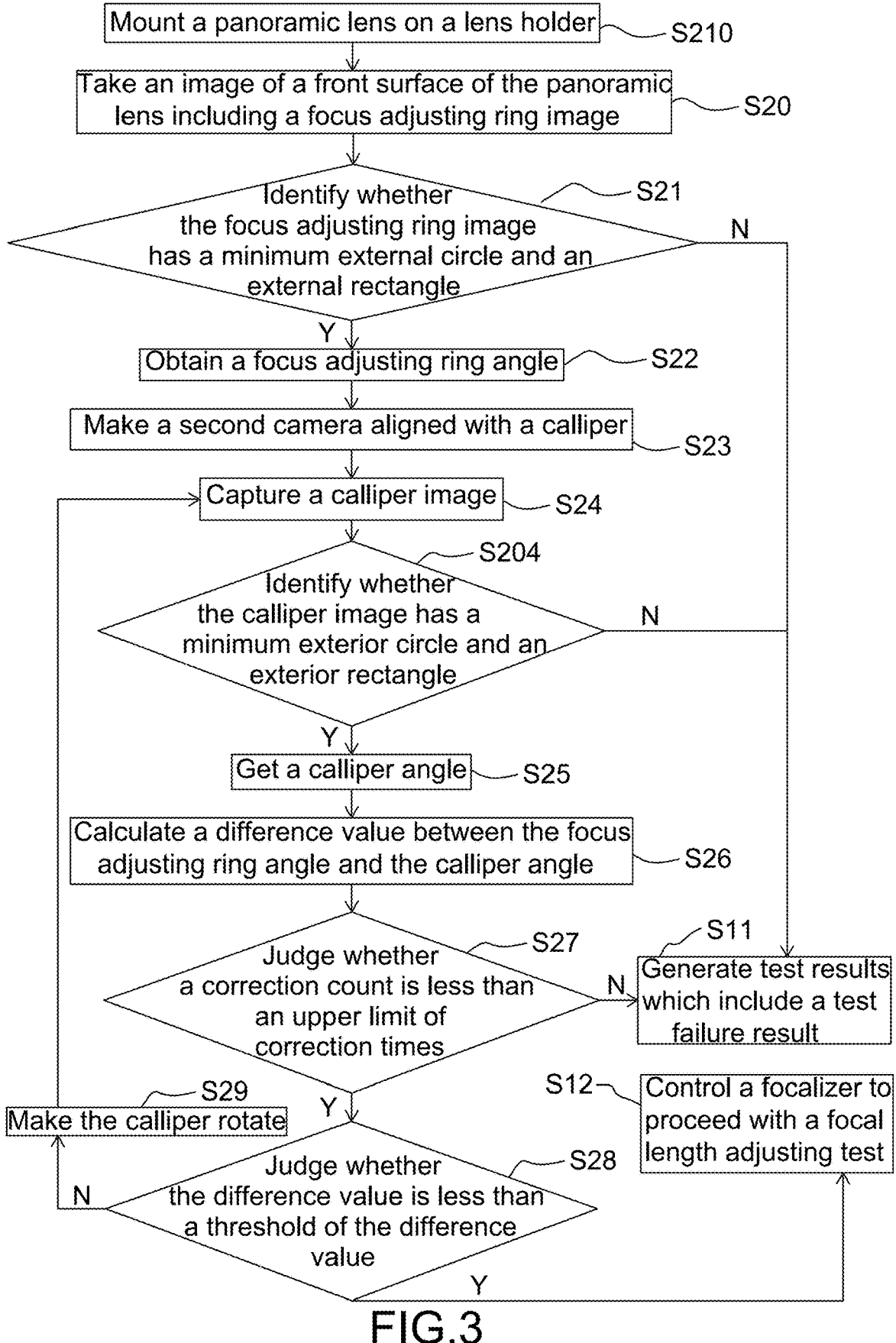
FIG. 3 is a flow chart of a position correction process of the panoramic lens focusing workstation in accordance with the present invention.

Referring to FIG. 1, a verification method for a panoramic lens focusing workstation 200 in accordance with the present invention is shown. The panoramic lens focusing workstation 200 performs a focusing test on a panoramic lens 201. The panoramic lens focusing workstation 200 includes a base 10, a lens actuator assembly 20 fixed on an upper surface of the base 10, a lens holder 30 fixed on the lens actuator assembly 20, an image capturing unit 40 arranged on the lens holder 30, a focalizer 50 fastened on the upper surface of the base 10, a plurality of light source units 60 fastened on four corners of the base 10, a first camera 70 fastened above the base 10, a second camera 80 mounted on the lens actuator assembly 20, and a control unit 90 electrically connected with the lens actuator assembly 20, the first camera 70, the focalizer 50, the plurality of the light source units 60, the second camera 80 and the image capturing unit 40. The panoramic lens 201 is mounted on the image capturing unit 40. In the present invention, a quantity of the plurality of the light source units 60 is four. The four light source units 60 are fastened to the four corners of the base 10.

In the present invention, the lens actuator assembly 20 includes a first linear rail 21 which is paralleled to the upper surface of the base 10, a second linear rail 22 disposed on the first linear rail 21, a third linear rail 23 disposed on the second linear rail 22, and a fourth linear rail 24 disposed on the third linear rail 23. A track of the first linear rail 21 is parallel to the upper surface of the base 10. The second linear rail 22 is connected with a slider of the first linear rail 21. The third linear rail 23 is connected with a slider of the second linear rail 22. The fourth linear rail 24 is connected with a slider of the third linear rail 23. The track of the first linear rail 21 is perpendicular to a track of the second linear rail 22. A track of the third linear rail 23 is perpendicular to the track of the second linear rail 22. The track of the first linear rail 21 is provided in a forward and rearward direction, and the track of the second linear rail 22 is provided in a leftward and rightward direction. The track of the third linear rail 23 is perpendicular to a track of the fourth linear rail 24, and the track of the third linear rail 23 is parallel to the track of the first linear rail 21. The first linear rail 21, the second linear rail 22, the third linear rail 23 and the fourth linear rail 24 are driven by a servo motor, so that the control unit 90 controls the lens actuator assembly 20 to move the lens holder 30 to any specified positions.

The lens holder 30 and the second camera 80 are both arranged on the lens actuator assembly 20 to drive the lens holder 30 and the second camera 80 move to designated positions by the lens actuator assembly 20, and the lens holder 30 is provided for fastening the panoramic lens 201. When the slider of the first linear rail 21 moves, the lens holder 30 and the second camera 80 are driven by the slider of the first linear rail 21 to move forward or rearward. When the slider of the second linear rail 22 moves, the lens holder 30 and the second camera 80 are driven by the slider of the second linear rail 22 to move leftward or rightward. When the slider of the third linear rail 23 moves, the lens holder 30 is driven by the slider of the third linear rail 23 to slightly move forward or rearward. When the slider of the fourth linear rail 24 moves, the lens holder 30 is driven to slightly move leftward or rightward. The image capturing unit 40 is mounted on the lens holder 30, and the image capturing unit 40 is located at an optical axis of the panoramic lens 201 to capture images through the panoramic lens 201.

Figure 4:
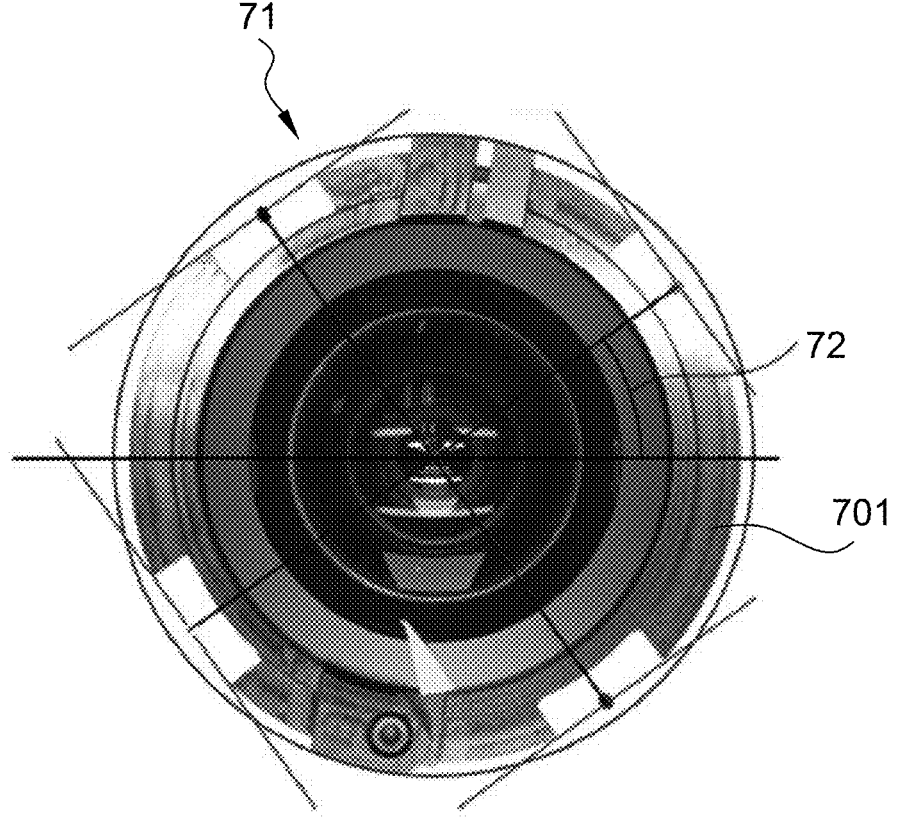
FIG. 4 is a focus adjusting ring image captured by a first camera, wherein the focus adjusting ring image is captured when the panoramic lens focusing workstation performs the position correction process on the panoramic lens according to the present invention.
Figure 5:
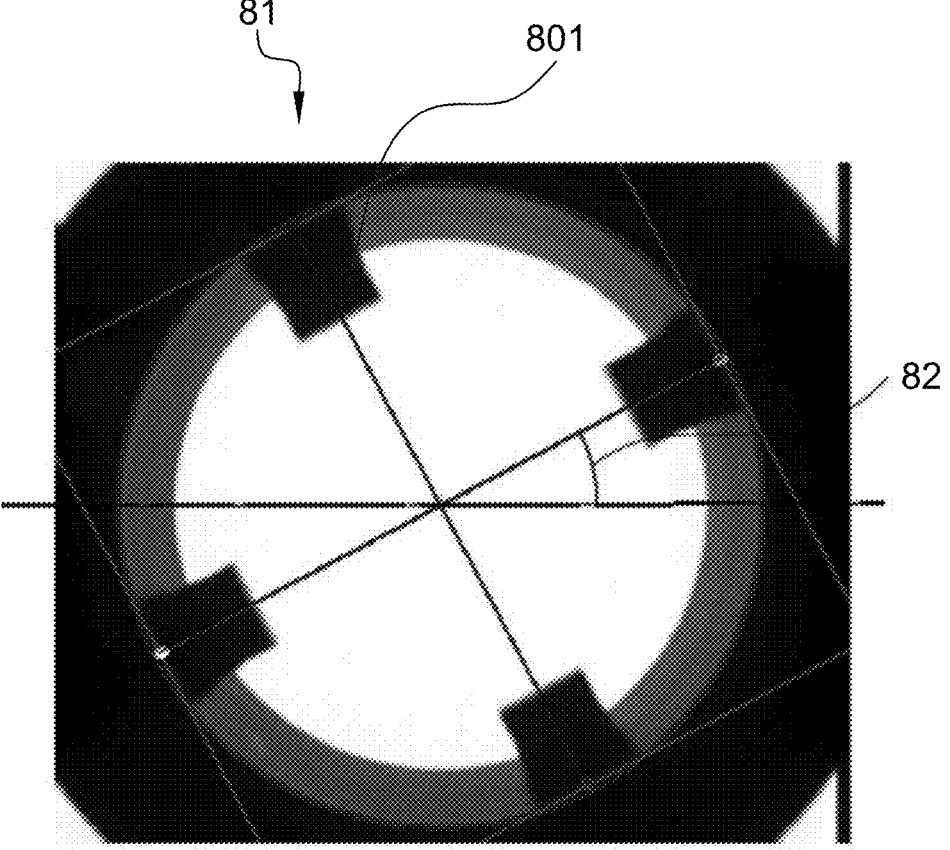
FIG. 5 is a calliper image captured by a second camera, wherein the calliper image is captured when the panoramic lens focusing workstation performs the position correction process on the panoramic lens according to the present invention.
Figure 7:
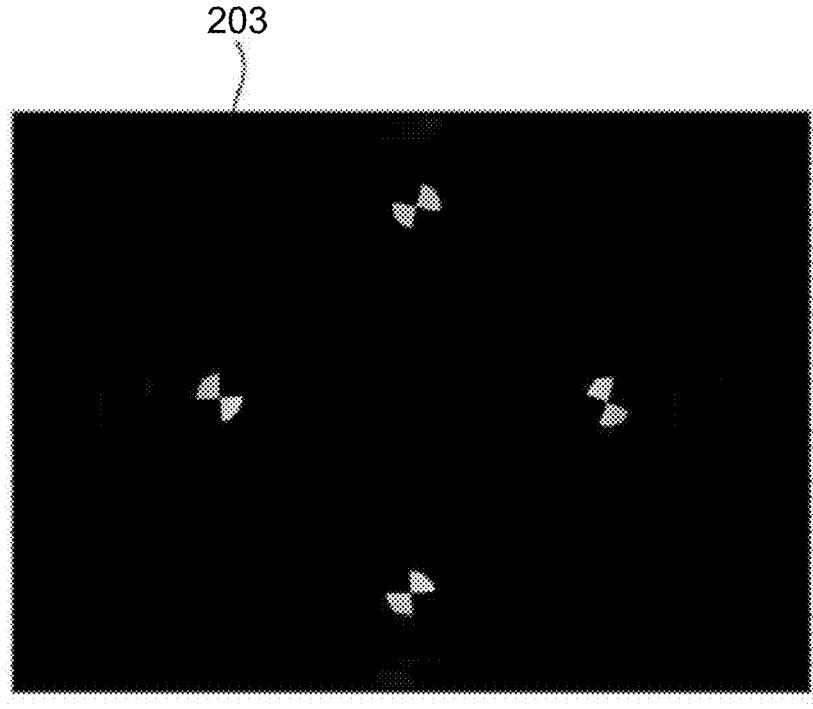
FIG. 7 is a calibration image captured to be graded, wherein the calibration image is captured when the panoramic lens is focused by the panoramic lens focusing workstation.
Figure 8:
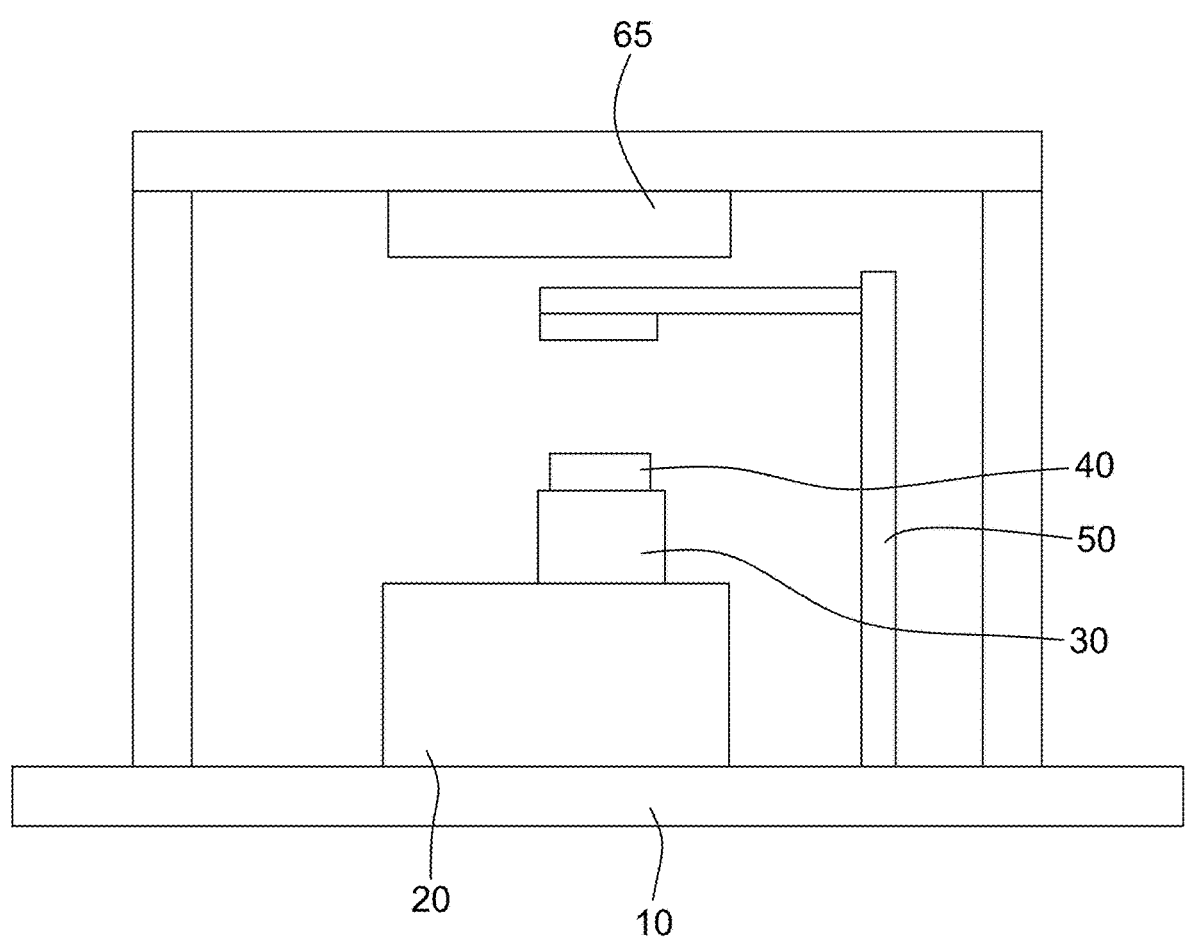
FIG. 8 is an architectural diagram of a lens focusing workstation in prior art.

Referring to FIG. 1, FIG. 4 and FIG. 5, the panoramic lens 201 has a focus adjusting ring 701. The focalizer 50 has a calliper 801. The calliper 801 is matched with the focus adjusting ring 701, and the profile of the calliper 801 is matched with the profile of the focus adjusting ring 701. The focalizer 50 is located at a right side of the track of the first linear rail 21. The focalizer 50 includes a fifth linear rail 51, and a first rotary plate 52 disposed to a slider of the fifth linear rail 51. A track of the fifth linear rail 51 is placed in an upward and downward direction. The track of the fifth linear rail 51 is parallel to a rotation axis of the first rotary plate 52, and the track of the fifth linear rail 51 is perpendicular to the track of the first linear rail 21. The fifth linear rail 51 and the first rotary plate 52 are both driven by the servo motor. The slider of the fifth linear rail 51 moves to drive the calliper 801 close to the lens holder 30 or away from the lens holder 30. The calliper 801 is disposed to the first rotary plate 52. The first rotary plate 52 rotates to drive the calliper 801 to rotate in a clockwise direction or a counter-clockwise direction, so that a relative distance between the calliper 801 and the focus adjusting ring 701 is adjusted, and a relative angle between the calliper 801 and the focus adjusting ring 701 is adjusted.

Referring to FIG. 1 again, the control unit 90 is electrically connected to the lens actuator assembly 20 and the focalizer 50 to control an operation of the servo motor in the lens actuator assembly 20 and the focuser 50. The control unit 90 is electrically connected to the first camera 70 and the second camera 80 to receive images captured by the first camera 70 and the second camera 80. The control unit 90 is electrically connected to the light source unit 60 to control the light source unit 60 to be switched on or switched off. The control unit 90 is electrically connected to the image capturing unit 40 to receive the images captured by the image capturing unit 40 to judge whether a focusing test of the panoramic lens 201 is successful.

Referring to FIG. 1 to FIG. 5, the panoramic lens focusing workstation 200 is disposed before an active calibration workstation and after the active calibration workstation. The panoramic lens 201 is affixed to a printed circuit board assembly of the lens holder 30 at the active calibration workstation. Before the panoramic lens 201 is affixed to the printed circuit board assembly of the lens holder 30, the focusing test of the panoramic lens 201 is performed by the panoramic lens focusing workstation 200, and after the panoramic lens 201 is affixed to the printed circuit board assembly of the lens holder 30, the focusing test of the panoramic lens 201 is performed by the panoramic lens focusing workstation 200. Specific steps of the verification method for the panoramic lens focusing workstation 200 are described as follows.

S10: control the lens actuator assembly 20 and the focalizer 50 according to preset data stored in a storage medium of the control unit 90 to calibrate a position of the panoramic lens 201 and a position of the calliper 801, and then move the focus adjusting ring 701 to the position of the calliper 801 to make the calliper 801 aligned with the focus adjusting ring 701. Specifically, capture an image of the focus adjusting ring 701 by the first camera 70 and capture an image of the calliper 801 by the second camera 80. Align the image of the focus adjusting ring with the image of the calliper 801. Adjust the position of the calliper 801 and the position of the focus adjusting ring 701 until the image of the focus adjusting ring is aligned with the image of the calliper 801.

S101: execute the next step S11 of generating test results which include a test failure result and controlling the lens actuator assembly 20 according to the preset data to return the lens actuator assembly 20 back to an initial position of the lens actuator assembly 20 if the control unit 90 judges that the image of the focus adjusting ring 701 is unable to be correctly aligned with the image of the calliper 801. Or, execute a step S12 of controlling the focalizer 50 to adjust a focal length of the panoramic lens 201 to proceed with a focal length adjusting test if the control unit 90 judges that the image of the focus adjusting ring 701 is able to be correctly aligned with the image of the calliper 801.

S11: generate the test results which include the test failure result by the control unit 90, and control the lens actuator assembly 20 according to the preset data to return the lens actuator assembly 20 back to an original point. The original point is the initial position of the lens actuator assembly 20.

S12: control the focalizer 50 according to the preset data by the control unit 90 to adjust the focal length of the panoramic lens 201 to proceed with the focal length adjusting test of the panoramic lens 201.

S102: execute the step S11 of generating the test results which include the test failure result and controlling the lens actuator assembly 20 according to the preset data to return the lens actuator assembly 20 back to the initial position if the control unit 90 judges that the panoramic lens 201 does not pass the focal length adjusting test. Or, execute the next step S13 of generating the test results which include a test passing result by the control unit 90, and controlling the lens actuator assembly 20 according to the preset data to return the lens actuator assembly 20 back to the initial position if the control unit 90 judges that the panoramic lens 201 passes the focal length adjusting test.

S13: generate the test results which include the test passing result by the control unit 90, and control the lens actuator assembly 20 according to the preset data to return the lens actuator assembly 20 back to the initial position. In the present invention, the control unit 90 has a user interface for displaying the test results, so the test results are displayed by the user interface of the control unit 90.

Referring to FIG. 1 to FIG. 6, the verification method for the panoramic lens focusing workstation 200 includes a position correction process of the panoramic lens focusing workstation 200. The step S10 of controlling the lens actuator assembly 20 and the focalizer 50 according to the preset data stored in the storage medium of the control unit 90_is to calibrate the position of the panoramic lens 201 and the position of the calliper 801, and then moves the focus adjusting ring 701 to the position of the calliper 801 that means the image of the calliper 801 is aligned with the image of the focus adjusting ring 701, and the step S101 executes the step S11 of generating the test results which include the test failure result and controlling the lens actuator assembly 20 according to the preset data to return the lens actuator assembly 20 back to the initial position if the control unit 90 judges that the focus adjusting ring 701 is unable to be correctly aligned with the calliper 801, and executes the step S12 of controlling the focalizer 50 to adjust the focal length of the panoramic lens 201 to proceed with the focal length adjusting test if the control unit 90 judges that the focus adjusting ring 701 is able to be correctly aligned with the calliper 801. The focal length adjusting test includes the following steps of the position correction process of the panoramic lens focusing workstation 200.

S210: mount the panoramic lens 201 to the lens holder 30 by an operator. The panoramic lens 201 is mounted on the image capturing unit 40. The panoramic lens 201 is connected to the image capturing unit 40. The image capturing unit 40 is located at the optical axis of the panoramic lens 201. To be more specific, in the panoramic lens focusing workstation 200 which is disposed as a previous workstation of the active calibration workstation, the lens holder 30 has the printed circuit board assembly electrically connected to the image capturing unit 40, the panoramic lens 201 is fastened to the lens holder 30 by the operator, and then the printed circuit board assembly which is connected to the image capturing unit 40 is connected to the panoramic lens 201 by the operator, so that the panoramic lens 201 is electrically connected to the image capturing unit 40 via the printed circuit board assembly. In the panoramic lens focusing workstation 200 which is disposed as a next workstation of the active calibration workstation, the panoramic lens 201 which has been affixed to the printed circuit board assembly is fastened to the lens holder 30 by the operator.

S20: control the lens actuator assembly 20 according to the preset data by the control unit 90 to move the panoramic lens 201 from the initial position to a position under the first camera 70 to be aligned with the first camera 70, and the control unit 90 controls the first camera 70 to take an image of a front surface of the panoramic lens 201 including a focus adjusting ring image 71, and send the image of the front surface of the panoramic lens 201 including the focus adjusting ring image 71 back, then execute the next step S21.

S21: identify whether the focus adjusting ring image 71 has a minimum external circle and an external rectangle according to the preset data. Execute the next step S22 when the focus adjusting ring image 71 has the minimum external circle and the external rectangle. Execute the step S11 of generating the test results which include the test failure result and controlling the lens actuator assembly 20 according to the preset data to return the lens actuator assembly 20 back to the initial position when the focus adjusting ring image 71 does not have the minimum external circle and the external rectangle.

S22: calculate an angle of the external rectangle of the focus adjusting ring image 71 deviated from a horizontal axis by the control unit 90 to obtain a focus adjusting ring angle 72, and then execute the next step S23. In the present invention, the external rectangle of the focus adjusting ring image 71 is a roughly square shape. When the control unit 90 calculates the angle of the external rectangle of the focus adjusting ring image 71 deviated from the horizontal axis, take an upper left corner of the focus adjusting ring image 71 as a center to rotate an imaginary line counterclockwise from the horizontal axis, and the imaginary line passes through an extension line of an edge of the external rectangle of the focus adjusting ring image 71. The focus adjusting ring angle 72 is an angle which is formed between the horizontal axis and a first extension line of the external rectangle of the focus adjusting ring image 71 that the imaginary line encounters at the time of the imaginary line rotating.

S23: control the lens actuator assembly 20 according to the preset data by the control unit 90 to move the second camera 80 forward to make the second camera 80 under the calliper 801 and aligned with the calliper 801, return a correction count to zero, and then execute the next step S24.

S24: control the second camera 80 to capture a calliper image 81 by the control unit 90, and the second camera 80 transmits the calliper image 81 back to the control unit 90.

S204: identify whether the calliper image 81 has a minimum exterior circle and an exterior rectangle according to the preset data by the control unit 90. When the calliper image 81 has the minimum exterior circle and the exterior rectangle, execute the next step S25. When the calliper image 81 does not have the minimum exterior circle and the exterior rectangle, execute the step S11 of generating the test results which include the test failure result and controlling the lens actuator assembly 20 according to the preset data to return the lens actuator assembly 20 back to the initial position.

S25: calculate an angle of the exterior rectangle of the calliper image 81 deviated from the horizontal axis by the control unit 90 to get a calliper angle 82, and then execute the next step S26. In this present invention, the method for obtaining the calliper angle 82 is similar to the method for obtaining the focus adjusting ring angle 72. When the control unit 90 calculates the angle of the exterior rectangle of the calliper image 81 deviated from the horizontal axis, the control unit 90 takes an upper left corner of the calliper image 81 as a center to rotate the imaginary line counterclockwise from the horizontal axis, and the imaginary line passes through an extension line of an edge of the exterior rectangle of the calliper image 81. The calliper angle 82 is an angle which is formed between the horizontal axis and a first extension line of the exterior rectangle of the calliper image 81 that the imaginary line encounters at the time of the imaginary line rotating.

S26: calculate a difference value between the focus adjusting ring angle 72 and the calliper angle 82 by the control unit 90, and then execute the next step S27.

S27: compare the correction count with an upper limit of correction times to judge whether the correction count is less than the upper limit of the correction times by the control unit 90. When the correction count is less than the upper limit of the correction times, execute the next step S28. When the correction count is equal to or greater than the upper limit of the correction times, execute the step S11 of generating the test results which include the test failure result and controlling the lens actuator assembly 20 according to the preset data to return the lens actuator assembly 20 back to the initial position. The upper limit of the correction times, a threshold of the difference value, and an upper limit of focusing times are preset values and are stored in the storage medium accessible by the control unit 90.

S28: compare the difference value between the focus adjusting ring angle 72 and the calliper angle 82 with the threshold of the difference value by the control unit 90 to judge whether the difference value between the focus adjusting ring angle 72 and the calliper angle 82 is less than the threshold of the difference value. When the difference value between the focus adjusting ring angle 72 and the calliper angle 82 is less than the threshold of the difference value, execute the step S12 of controlling the focalizer 50 according to the preset data by the control unit 90 to adjust the focal length of the panoramic lens 201 to proceed with the focal length adjusting test of the panoramic lens 201. When the difference value between the focus adjusting ring angle 72 and the calliper angle 82 is equal to or greater than the threshold of the difference value, execute the next step S29. In practice, when the difference value between the focus adjusting ring angle 72 and the calliper angle 82 is less than the threshold of the difference value, the image of the focus adjusting ring 701 and the image of the calliper 801 are able to be correctly matched with each other, and the panoramic lens 201 and the focalizer 50 is able to be assembled correctly. On the other hand, when the difference value between the focus adjusting ring angle 72 and the calliper angle 82 is equal to or greater than the threshold of the difference value, the image of the focus adjusting ring 701 and the image of the calliper 801 are unable to be correctly matched with each other, and the panoramic lens 201 and the focalizer 50 are unable to be assembled correctly.

S29: control the focalizer 50 according to the preset data by the control unit 90 to make the calliper 801 rotate towards a specified direction to a specified angle, add one to the correction count, and then execute the step S24 of controlling the second camera 80 to capture the calliper image 81 by the control unit 90, and the second camera 80 transmits the calliper image 81 back to the control unit 90. In this present invention, the preset data includes a parameter of the servo motor, such as, a rotation angle of the calliper 801 which is corresponding to a rotation scale of the servo motor. The control unit 90 converts the difference value between the focus adjusting ring angle 72 and the calliper angle 82 into the rotation scale of the servo motor to control the servo motor to make the focalizer 50 rotate the calliper 801, so that the difference value between the focus adjusting ring angle 72 and the calliper angle 82 is lowered.

Referring to FIG. 1 to FIG. 7, specific steps of focusing the panoramic lens 201 by the panoramic lens focusing workstation 200 are described as follows. The step S12 of controlling the focalizer 50 according to the preset data by the control unit 90 is to adjust the focal length of the panoramic lens 201 to proceed with the focal length adjusting test of the panoramic lens 201, and the step S102 executes the step S11 of generating the test results which include the test failure result and controlling the lens actuator assembly 20 according to the preset data to return the lens actuator assembly 20 back to the initial position if the control unit 90 judges that the panoramic lens 201 does not pass the focusing test, and executes the step S13 of generating the test results which include the test passing result by the control unit 90, and controlling the lens actuator assembly 20 according to the preset data to return the lens actuator assembly 20 back to the initial position if the control unit 90 judges that the panoramic lens 201 passes the focusing test including the following specific steps of focusing the panoramic lens 201.

S30: control the focalizer 50 according to the preset data by the control unit 90 to move the calliper 801 downwardly until the calliper 801 is aligned with the focus adjusting ring 701 and the image of the calliper 801 is matched with the image of the focus adjusting ring 701. Return the focusing times to zero, and then execute the next step S31.

S31: switch on the plurality of the light source units 60 by the control unit 90, capture a calibration picture 61 by the panoramic lens 201 and the image capturing unit 40, capture a calibration image 203 which is to be graded and contains the calibration picture 61, transmit the calibration image 203 to the control unit 90, and then execute the next step S32. In this present invention, light pipes of the plurality of the light source units 60 provide the calibration picture 61.

S32: compare the focusing times to the upper limit of the focusing times by the control unit 90 to judge whether the focusing times are less than the upper limit of the focusing times. When the focusing times are less than the upper limit of the focusing times, execute the next step S33. When the focusing times are equal to or greater than the upper limit of the focusing times, execute the step S11 of generating the test results which include the test failure result by the control unit 90, and controlling the lens actuator assembly 20 according to the preset data to return the lens actuator assembly 20 back to the initial position.

S33: analyze the calibration image 203 according to the preset data by the control unit 90 to obtain a rating.

S303: judge whether the rating of the calibration image 203 is within a preset rating range by the control unit 90. When the rating of the calibration image 203 is within the preset rating range, execute the step S13 of generating the test results which include the test passing result by the control unit 90, and controlling the lens actuator assembly 20 according to the preset data to return the lens actuator assembly 20 back to the initial position. When the rating of the calibration image 203 exceeds the preset rating range, execute the next step S34. In this present invention, the preset rating range is from 0.4 to 0.6.

S34: control the focalizer 50 according to the preset data by the control unit 90 to make the calliper 801 move towards the specified direction slightly and rotate by the specified angle, and add one to the focusing times, and then execute the step S31 of switching on the plurality of the light source units 60 by the control unit 90, capturing the calibration picture 61 by the panoramic lens 201 and the image capturing unit 40, capturing the calibration image 203 which is to be graded and contains the calibration picture 61, transmitting the calibration image 203 to the control unit 90.

The control unit 90 is able to be a desktop computer including a screen and a keyboard, a notebook computer, any component or any device which is suitable for display interfaces and is capable of receiving functions including a user input, a data access, a data computation and a data storage, or similar functions. The control unit 90 is without being limited to be the desktop computer including the screen and the keyboard, the notebook computer, any component or any device which is suitable for the display interfaces and is capable of receiving the functions including the user input, the data access, the data computation and the data storage, or the similar functions.

As described above, the verification method for the panoramic lens focusing workstation 200 is able to proceed with a focusing operation of the panoramic lens 201, the panoramic lens focusing workstation 200 adjusts the focal length of the panoramic lens 201 before the panoramic lens 201 is affixed to the printed circuit board assembly and after the panoramic lens 201 is affixed to the printed circuit board assembly, so a focusing misalignment of the panoramic lens 201 is prevented after the panoramic lens 201 is processed. As a result, a precision of the focal length of the panoramic lens 201 is improved, and quality of the panoramic lens 201 is improved.

Though the present invention is disclosed as the above-mentioned preferred embodiment, the preferred embodiment disclosed in this invention is without being intended to limit a scope of this invention. In related technical fields, anyone with ordinary knowledges should be able to make a few changes and embellishments within a spirit and a protection scope of this invention, so the protection scope of this invention should regard defined claims of an attached application patent as a standard.

What is claimed is:

1. A verification method for a panoramic lens focusing workstation, the panoramic lens focusing workstation performing a focusing test on a panoramic lens, the panoramic lens having a focus adjusting ring, the panoramic lens focusing workstation having a base, a lens actuator assembly fixed on the base, a lens holder fixed on the lens actuator assembly, an image capturing unit arranged on the lens holder, a focalizer fastened on the base, a plurality of light source units fastened on four corners of the base, a first camera fastened above the base, a second camera mounted on the lens actuator assembly, and a control unit electrically connected with the lens actuator assembly, the first camera, the focalizer, the plurality of the light source units, the second camera and the image capturing unit, the image capturing unit being located at an optical axis of the panoramic lens to capture images through the panoramic lens, the focalizer having a calliper configured to align with the focus adjusting ring, the plurality of the light source units providing a calibration picture, the panoramic lens being mounted on the image capturing unit, the verification method for the panoramic lens focusing workstation comprising the following steps:

(S20) controlling the lens actuator assembly according to preset data to move the panoramic lens from an initial position to a position under the first camera to be aligned with the first camera, and controlling the first camera to take an image of a front surface of the panoramic lens including a focus adjusting ring image, then executing step (S21);

(S21) identifying a minimum external circle and an external rectangle of the focus adjusting ring image, and executing step (S22) if the minimum external circle and the external rectangle are identified, or executing step (S11) if the minimum external circle and the external rectangle cannot be identified;

(S22) calculating an angle of the external rectangle of the focus adjusting ring image deviated from a horizontal axis to obtain a focus adjusting ring angle, and then executing step (S23);

(S23) controlling the lens actuator assembly according to the preset data and move the second camera forward to make the second camera aligned with the calliper, setting a correction count to zero, and then executing step (S24);

(S24) controlling the second camera to capture a calliper image, identifying whether the calliper image has a minimum exterior circle and an exterior rectangle, and executing step (S25) if the minimum exterior circle and the exterior rectangle in the calliper image are identified, or executing step (S11) if the minimum exterior circle and the exterior rectangle in the calliper iamge cannot be identified;

(S25) calculating an angle of the exterior rectangle of the calliper image deviated from a horizontal axis to get a calliper angle, and then executing step (S26);

(S26) calculating a difference value between the focus adjusting ring angle and the calliper angle, and then executing step (S27);

(S27) comparing the correction count with a preset upper limit of correction times to judge whether the correction count is less than the preset upper limit of the correction times, and executing step (S28) if the correction count is less than the preset upper limit of the correction times, or executing step (S11) if the correction count is equal to or greater than the preset upper limit of the correction times;

(S28) comparing a difference value between the focus adjusting ring angle and the calliper angle with a preset threshold of the difference value, and executing step (S30) if the difference value between the focus adjusting ring angle and the calliper angle is less than the preset threshold of the difference value, or executing step (S29) if the difference value between the focus adjusting ring angle and the calliper angle is equal to or greater than the preset threshold of the difference value;

(S29) controlling the focalizer according to the preset data to make the calliper rotate towards a specified direction to a specified angle, adding one to the correction count, and then executing step (S24);

(S30) controlling the focalizer according to the preset data to engage the calliper with the focus adjusting ring, setting a focusing count to zero, and then executing step (S31);

(S31) switching on the plurality of the light source units, controlling the image capturing unit to capture a calibration image which contains the calibration picture through the panoramic lens, transmitting the calibration image to the control unit, and then executing step (S32);

(S32) comparing the focusing count to a preset upper limit of the focusing count, and executing step (S33) if the focusing count is less than the preset upper limit of the focusing count, or executing step (S11) if the focusing count is equal to or greater than the preset upper limit of the focusing count;

(S33) analyzing the calibration image according to the preset data to obtain a rating, and executing step (S13) if the rating of the calibration image is within a preset rating range, or executing step (S34) if the rating of the calibration image exceeds the preset rating range;

(S34) controlling the focalizer according to the preset data to make the calliper move towards a specified direction and rotate slightly by a specified angle, and adding one to the focusing count, and then executing step (S31);

(S11) generating test results which include a test failure result, and controlling the lens actuator assembly according to the preset data to return the lens actuator assembly back to an initial position of the lens actuator assembly; and (S13) generating test results which include a test passing result, and controlling the lens actuator assembly according to the preset data to return the lens actuator assembly back to the initial position of the lens actuator assembly.

2. The verification method for the panoramic lens focusing workstation as claimed in claim 1, wherein the test results are displayed by a user interface of the control unit.

3. The verification method for the panoramic lens focusing workstation as claimed in claim 1, further comprising a step of mounting the panoramic lens to the lens holder, the lens holder having a printed circuit board assembly electrically connected to the image capturing unit, the printed circuit board assembly being connected to the panoramic lens, and the panoramic lens being electrically connected to the image capturing unit via the printed circuit board assembly.

4. The verification method for the panoramic lens focusing workstation as claimed in claim 1, wherein the lens holder has a printed circuit board assembly electrically connected to the image capturing unit, the panoramic lens is fastened to the lens holder, and the panoramic lens is affixed to the printed circuit board assembly.

5. The verification method for the panoramic lens focusing workstation as claimed in claim 1, wherein the lens actuator assembly includes a first linear rail which is paralleled to an upper surface of the base, a second linear rail disposed on the first linear rail, a third linear rail disposed on the second linear rail, and a fourth linear rail disposed on the third linear rail, the second linear rail is connected with a slider of the first linear rail, a track of the first linear rail is perpendicular to a track of the second linear rail, the third linear rail is connected with a slider of the second linear rail, a track of the third linear rail is perpendicular to the track of the second linear rail, the fourth linear rail is connected with a slider of the third linear rail, the track of the third linear rail is perpendicular to a track of the fourth linear rail, and the first linear rail, the second linear rail, the third linear rail and the fourth linear rail are driven by a servo motor so that the control unit controls the lens actuator assembly to move the lens holder to specified positions.

6. The verification method for the panoramic lens focusing workstation as claimed in claim 5, wherein the focalizer includes a fifth linear rail, and a first rotary plate disposed to a slider of the fifth linear rail, the fifth linear rail and the first rotary plate are both driven by the servo motor so that a relative distance between the calliper and the focus adjusting ring is adjustable, and a relative angle between the calliper and the focus adjusting ring is adjustable.

* * * * *